United States Patent [19]
Defontaine et al.

[11] Patent Number: 5,606,205
[45] Date of Patent: Feb. 25, 1997

[54] INDUCTION MODULE FOR AN ASYNCHRONOUS LINEAR ELECTRIC MOTOR AND METHOD FOR MANUFACTURING SAME

[76] Inventors: Jean-Claude Defontaine, 9, rue de Tarare, 69400 Villefranche-sur-Saone; Bernard Defontaine, 238 Chemin de Pinachère, 01700 Beynost, both of France

[21] Appl. No.: 290,733

[22] PCT Filed: Feb. 24, 1993

[86] PCT No.: PCT/FR93/00183

§ 371 Date: Oct. 17, 1994

§ 102(e) Date: Oct. 17, 1994

[87] PCT Pub. No.: WO93/17487

PCT Pub. Date: Sep. 2, 1993

[30] Foreign Application Priority Data

Feb. 24, 1992 [FR] France .................................. 92 02324

[51] Int. Cl.$^6$ .............................................. H02K 41/025
[52] U.S. Cl. ............................................................ 310/12
[58] Field of Search .................................. 310/12, 13, 42, 310/43, 44, 45

[56] References Cited

U.S. PATENT DOCUMENTS

| 1,929,990 | 10/1933 | Rose | 310/13 |
| 4,171,493 | 10/1979 | Brimer et al. | 310/13 |
| 4,620,301 | 10/1986 | Koide | 369/266 |
| 4,704,568 | 11/1987 | Beck et al. | 318/687 |

FOREIGN PATENT DOCUMENTS

| 0166350 | 1/1986 | European Pat. Off. . |
| 95621 | 2/1973 | Germany . |
| 2824951 | 12/1979 | Germany . |
| 55-94562 | 7/1980 | Japan . |
| 62-299607 | 8/1989 | Japan . |
| 474893 | 8/1969 | Switzerland . |
| 1466426 | 3/1977 | United Kingdom . |

*Primary Examiner*—Steven L. Stephan
*Assistant Examiner*—Judson H. Jones
*Attorney, Agent, or Firm*—Young & Thompson

[57] ABSTRACT

Induction module for an asynchronous linear electric motor comprising an outer protective shell (7) of parallelepipedic form, constituted by a rectangular horizontal bottom (4), two opposite vertical and longitudinal walls (5) and two opposite vertical and transverse walls (6). A laminated magnetic circuit is constituted by a bar (8), of generally parallelepipedic shape, of smaller length and smaller width than the inner length and width of the protective shell (7), extending along the longitudinal axis (xy) of the outer protective shell (7). This bar (8) has, in its upper part, a succession of transverse recesses (9) regularly spaced from one another in the longitudinal direction, opening out in the upper face (8b) and in the two vertical and longitudinal faces of the bar (8), delimiting therebetween teeth (11) constituting polar pieces. Inductor windings (13, 14, 16, 17, 18) are housed in the recesses (9) of the magnetic bar (8) and an insulating matter (15) fills the space left free inside the protective shell (7), between the latter and the magnetic bar (8) and the windings that it supports. The height of the magnetic bar (8) is greater than the height of the longitudinal (5) and transverse (6) walls of the protective shell (7), so that, after the insulating matter (15) has been cast, polar faces (8b) of the teeth (11) of the magnetic bar emerge from the block of solidified insulating matter (15). The inductor windings (13, 14, 16, 17, 18) are disposed respectively in different horizontal planes, the inductor winding (13) located in an upper plane comprising a number of turns greater than that of the winding (14) located in a plane therebeneath.

1 Claim, 2 Drawing Sheets

INDUCTION MODULE FOR AN ASYNCHRONOUS LINEAR ELECTRIC MOTOR AND METHOD FOR MANUFACTURING SAME

The present invention relates to an induction module for an asynchronous linear electric motor and to its method of manufacture.

A linear electric motor comprises a fixed or mobile inductor comprising an elongated rectilinear magnetic circuit, of substantially parallelepipedic general shape, in which are cut out a longitudinal succession of recesses separated from one another by teeth or polar pieces. In the recesses are housed conducting windings supplied by sinusoidal polyphased currents producing a sliding magnetic field. The linear motor also comprises an armature intended to ensure the return of the magnetic flux produced, this armature, mobile or fixed, delimiting a narrow air gap with the inductor, via support and guiding means interposed between the two elements. Under the effect of the Laplace force, there is produced a rectilinear movement of the armature if the inductor is maintained fixed or, inversely, of the inductor if the armature is mounted in fixed manner.

As described in Patent CH-A-474 893, a linear induction motor is already known, comprising an elongated box, of U-shaped transverse section, surrounding the magnetic circuit of the inductor and its windings. The space included between the box, the magnetic circuit and the windings is filled with an insulating mixture. As described in Patent DD-A-95 621, a sleeve for protecting a linear motor is also known, this sleeve also being able to constitute a casting mould and a stiffening element for an envelope of insulating synthetic resin cast around the magnetic circuit and its windings.

The present invention relates to improvements made to the inductors of the known linear motors, with a view to facilitating manufacture thereof and to lowering their cost price.

To that end, this induction module for an asynchronous linear electric motor comprising an outer protective shell of parallelepipedic form, constituted by a rectangular horizontal bottom, two opposite vertical and longitudinal walls and two opposite vertical and transverse walls, a laminated magnetic circuit constituted by a bar, of generally parallelepipedic shape, of smaller length and smaller width than the inner length and width of the protective shell, extending along the longitudinal axis of the outer protective shell, this bar presenting, in its upper part, a succession of transverse recesses regularly spaced from one another in the longitudinal direction, opening out in the upper face and in the two vertical and longitudinal faces of the bar, delimiting therebetween teeth constituting polar pieces, inductor windings housed in the recesses of the magnetic bar and an insulating matter filling the space left free inside the protective shell, between the latter and the magnetic bar and the windings that it supports, is characterized in that the height of the magnetic bar is greater than the height of the longitudinal and transverse walls of the protective shell, so that, after the insulating matter has been cast, the plane polar faces of the teeth of the magnetic bar emerge from the block of solidified insulating matter.

The invention also relates to a method for manufacturing induction modules for an asynchronous linear electric motor, characterized in that, to form the bar constituting the magnetic circuit, there is formed in the same band of magnetic sheet unwound from a reel, along one of its edges, a succession of pairs of recesses, by causing the sheet to pass through a punching station equipped with two identical punches, and after punching, there are cut out in the punched sheet, individual sections of sheet, having the desired width, each presenting a number of recesses equal to four or to a multiple of four, for making a magnetic bar for a monophase motor, or individual sections of sheet comprising a number of recesses equal to six or to a multiple of six, for making a magnetic bar for a three-phase motor.

Various forms of embodiment of the present invention will be described hereinafter by way of non-limiting examples, with reference to the accompanying drawings, in which.

Figure 1:
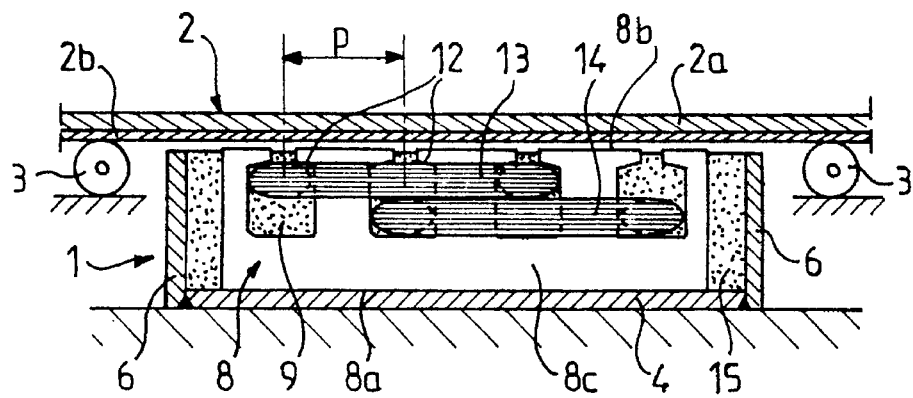
FIG. 1 is a view in vertical and longitudinal section of a monophase linear electric motor comprising an induction module according to the invention.
Figure 2:
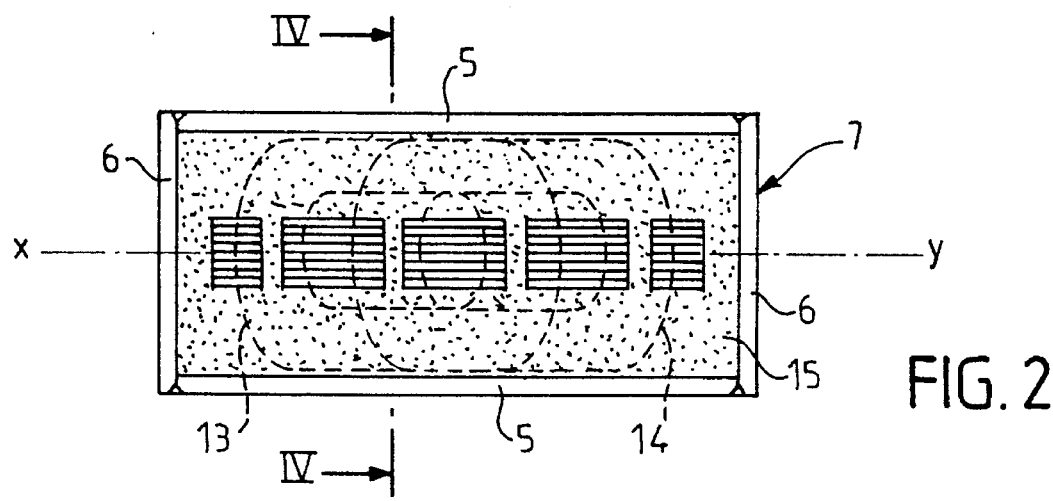
FIG. 2 is a plan view of the induction module shown in FIG. 1.

The linear electric motor shown schematically in FIG. 1 comprises an induction module 1 which is fixed and with which cooperates a mobile armature element 2. However, such an arrangement is not limitative, the inductor 1 being able to be mobile while the armature 2 is fixed. The induction module 1 has the general form of a rectangular parallelepiped, extending horizontally. The armature element 2 extends in a horizontal plane, above the induction module 1, so as to define with the magnetic circuit thereof, which will be described hereinbelow, a very small air gap of the order of some millimeters. The armature element 2 which is fast with the piece having to be driven, comprises for example an upper yoke 2a made of iron, and a lower rule 2b of copper. The small air gap is maintained between the induction module 1 and the armature element 2, by means of wheels or rollers 3, or any other support and guiding means.

The induction module 1 according to the invention, of generally parallelepipedic form, comprises a rectangular horizontal bottom 4, two opposite vertical and longitudinal walls 5 and two opposite vertical and transverse walls 6. The assembly of the walls 4, 5, 6 constitutes an outer protective shell 7 open in its upper part. This shell is made of any appropriate material, with good thermal conductivity, for example of aluminium.

Inside the protective shell 7 is housed a laminated magnetic circuit constituted by a bar 8, of generally parallelepipedic form, of smaller length and smaller width than the inner length and width of the protective shell 7. This magnetic bar 8 is constituted by a series of rectangular metal sheets, extending vertically and longitudinally and which are attached to one another. The magnetic bar 8 extends along the longitudinal axis xy of the protective shell 7. Its lower horizontal face 8a is in abutment against the bottom 4 of the protective shell 7, while its upper face 8b lies in a horizontal plane which is located above the horizontal plane containing the upper edges of the longitudinal (5) and transverse (6) walls of the protective body 7. In its upper part, the bar 8 presents a succession of transverse recesses 9 which open out in the upper face 8*b* of the bar 8, which are regularly spaced apart from one another, in the longitudinal direction, and which are cut out at a constant pitch in the individual sheets constituting the magnetic bar 8, as will be seen hereinbelow. The recesses 9 delimit therebetween teeth 11 constituting polar pieces. The interval separating two successive recesses 9 or two successive teeth 11 corresponds to a predetermined pitch p. The recesses 9 are cut out on either side through the magnetic bar 8, in the transverse direction, and they open out in the two vertical and longitudinal faces of this bar. Below the recesses 9 and the teeth 11 there remains a continuous lower part or sole 8*c* of the magnetic bar 8 which is in abutment on the bottom 4 of the shell 7.

Each tooth 11 of the magnetic bar 8 is preferably extended, at its upper end, by a polar opening-out 12 extending on either side of the tooth 11, in the longitudinal direction, in the direction of similar polar opening-outs provided on the two adjacent teeth 11. Consequently, the inlet of each recess 8, in the plane of the upper face 8*b* of the magnetic bar 8, has a smaller width than the width of the recess 8 below its inlet.

Figure 3:
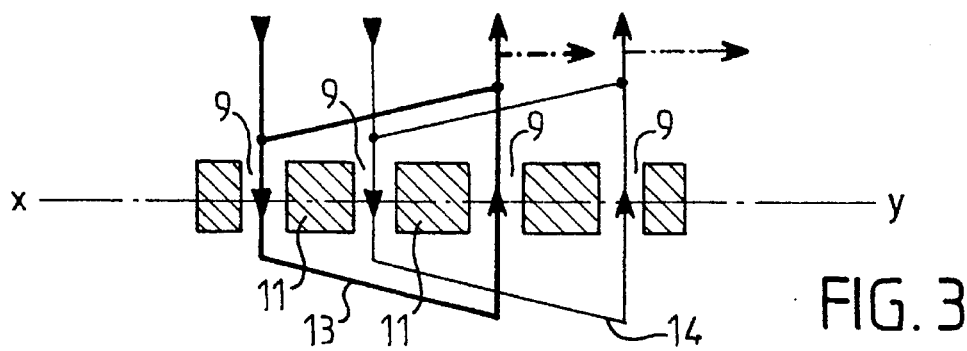
FIG. 3 is a diagram illustrating the arrangement of the windings in the magnetic circuit of the induction module of FIGS. 1 and 2.
Figure 4:
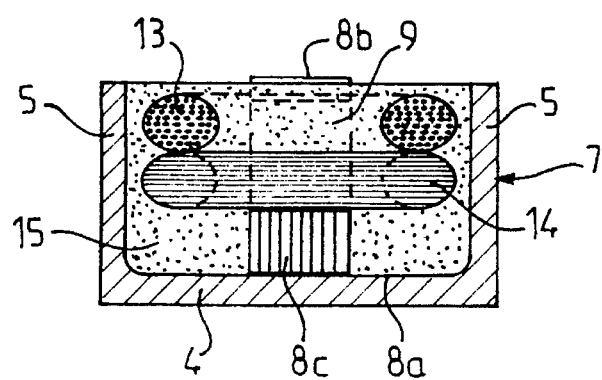
FIG. 4 is a view in vertical and transverse section made along line IV—IV of FIG. 2.

The induction module also comprises inductor windings of which the type and arrangement in the recesses 9 depend on the type of supply of the motor. In the embodiment shown in FIGS. 1 to 4, the coil of the motor is supplied by a monophase network and the coil of the motor comprises two inductor windings 13 and 14 which are respectively supplied with phase-shifted currents by means of a capacitor, in the usual manner. Depending on the power desired for the motor, each of the inductor windings 13, 14 comprises one or more coils connected in series and the magnetic bar 8 comprises a number of recesses equal to 4 n, n being a whole number equal to or greater than 1. The induction module corresponding to the elementary motor, of lower power which is shown in FIGS. 1 to 4, comprises a magnetic bar 8 having a minimum number of recesses, i.e. four recesses, and the two inductor windings 13 and 14 each comprise one sole coil. The coil of the first inductor winding 13 passes through the first and third recesses, while the coil of the second inductor winding 14 passes through the second and fourth recesses, as is shown. FIG. 3 schematically shows the arrangement of the windings 13 and 14 supplied with phase-shifted currents, winding 13 being indicated in thick lines while winding 14 is indicated in fine lines. Naturally, in the case of motors of higher power, the magnetic bar 8 comprises 8, 12, 16 . . . recesses and the inductor windings 13 and 14 comprise additional coils connected in series, as is indicated by the arrows in dashed-and-dotted lines in FIG. 3, these additional coils being housed in the following respective recesses in the same manner as those shown in FIG. 3.

To ensure protection of the magnetic bar 8 and the windings 13, 14 that it bears, an insulating matter 15, such as a resin, fills the space left free inside the protective shell 7, between the latter and the magnetic bar 8 and the windings 13, 14.

According to the invention, as indicated hereinabove, the height of the magnetic bar 8 is chosen slightly greater than the height of the longitudinal (5) and transverse (6) walls of the protective shell 7. Consequently, this results in a notable advantage during the final phase of manufacture of the induction module 1. During this final phase, the magnetic bar 8, provided with the windings 13, 14, is placed inside the protective shell 7, leaving a certain space free all around. In this space is then cast a hardenable insulating matter, such as a resin, so as to fill by gravity the interior of the protective shell 7 then performing the role of mould. Filling of this mould is stopped when the level of liquid resin inside is flush with the upper edges of the walls 5 and 6. In addition to the space located outside the magnetic bar 8, the resin then fills the empty parts of the recesses 9 and also the inlets thereof, located just above the windings 13, 14. However, the plane polar faces 8*b* of the teeth 11, which lie in the plane of the upper face 8*b* of the bar 8, are not attained by the resin and they thus remain totally disengaged. Consequently, after the resin 15 has hardened, the inductor module 1 presents polar faces 8*b* emerging from the block of solidified resin, which are perfectly neat, located in the same horizontal plane and it is therefore not necessary to proceed with an additional operation of treatment of these faces, hence a notable saving on the cost price of the induction module 1.

Figure 5:
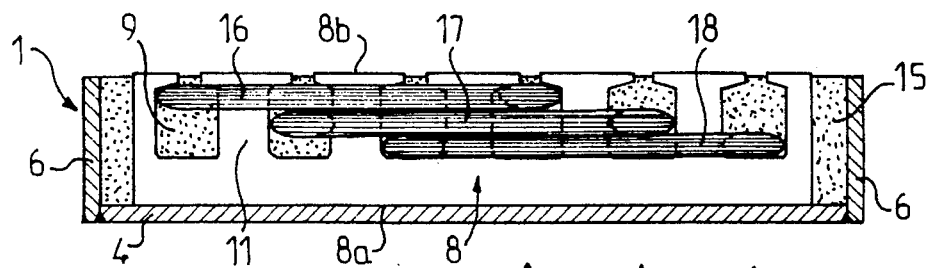
FIG. 5 is a view in vertical and longitudinal section of an induction module for a three-phase linear motor.
Figure 6:
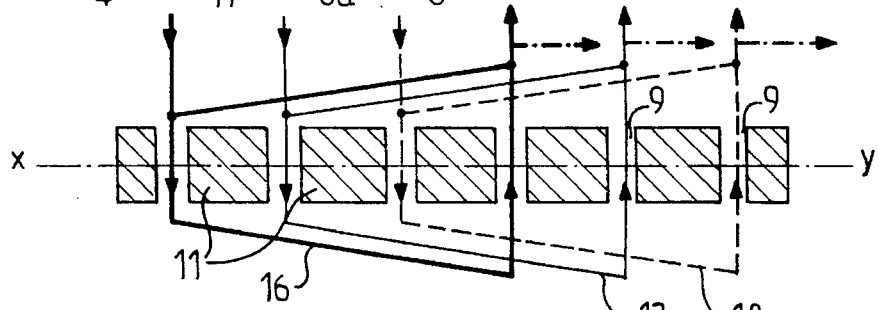
FIG. 6 is a diagram illustrating the arrangement of the windings in the magnetic circuit of the induction module shown in FIG. 5.

FIGS. 5 and 6 show an induction module 1 designed for a three-phase linear motor. The magnetic bar 8 then comprises a number of recesses 9 equal to six or to a multiple of six. The induction module 1 comprises in that case three inductor windings corresponding to the three phases of the supply current, namely a first upper winding 16 supplied by the first phase, lying in a horizontal upper plane, passing in the first and fourth recesses 9, a second winding 17, supplied by the second phase, extending, below the preceding one, in an intermediate horizontal plane and passing in the second and fifth recesses and finally a third lower winding 18, supplied by the third phase, lying in a lower plane and passing in the fourth and sixth recesses. These windings 16, 17 and 18 are shown in FIG. 6 respectively in thick lines, in fine lines and in broken lines. In the case of motors of higher power, the magnetic bar naturally comprises a larger number of recesses and coils, as in the case of the monophase motor.

Due to the superposed arrangement of the windings 13, 14 and 16, 17, 18 borne by the magnetic bar 8, it has appeared that, further to the variation in reductance resulting from the different arrangements of the windings with respect to the magnetic circuit, the currents consumed by the different windings are different. To compensate this difference, the or each winding of the or each lower plane, i.e. winding 14 of the lower plane in the monophase version and windings 17 of the intermediate plane and 18 of the lower plane in the three-phase version, is/are made with a number of turns lower than that of the winding 13 or 16 of the upper plane. For example, if the winding 13 of the upper plane, in the monophase version, comprises 600 turns of a copper wire having a diameter of 0.425 mm, winding 14 of the lower plan comprises only 575. In this way, equal current consumptions are obtained in the different windings and consequently speeds of displacement of the armature 2 which are equal in the two directions, are obtained.

Figure 7:
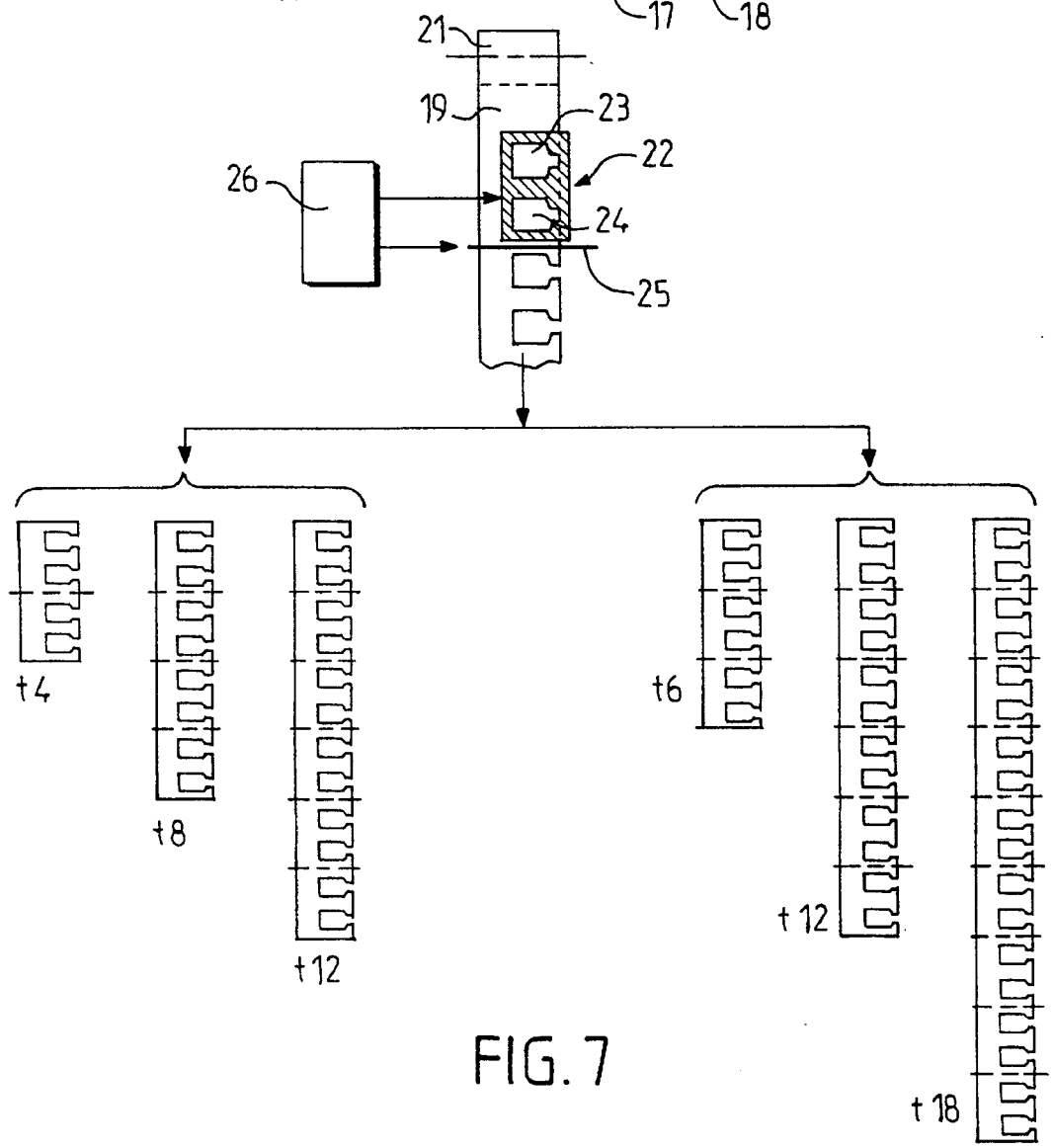
FIG. 7 is a schematic plan view illustrating the method of manufacturing the elementary sheets, intended to constitute the magnetic circuit of the induction module.

FIG. 7 schematically illustrates a particularly economical and supple method for the manufacture, upon order, of the individual sheets constituting the magnetic bars 8. The sections of sheet which are used, as a function of the desired power for the motor, are all cut out from the same band of magnetic sheet 19 which is continuously unwound from a reel 21. This band of sheet 19 is advanced in an intermittent movement, by known means (not shown) and it passes through a punching station 22 which is equipped with two identical punches 23 and 24, which are disposed so as to be able to cut out simultaneously a pair of recesses 9 in the same longitudinal edge of the sheet 19. After the punching station 22, the sheet is cut to the desired length by means of transverse shears 25 whose vertical movement is controlled, in the same way as that of the punches 23, 24, by an automatized control unit 26. The automatized apparatus for cutting out the sheet 19 thus makes it possible to obtain, as desired, as a function of the manufacturing programme, sections of sheet comprising a number of recesses equal to four or to a multiple of four, such as the sections of sheet $t_4$, $t_8$, $t_{12}$ respectivley with four, eight and twelve recesses, for making a magnetic bar 8 for a monophase motor, or sections of sheet comprising a number of recesses equal to six or to a multiple of six, such as the sections of sheet $t_6$, $t_{12}$, $t_{18}$ with six, twelve and eighteen recesses, in the case of a magnetic bar 8 provided for a three-phase motor.

We claim:

1. Induction module for an asynchronous linear electric motor comprising an outer protective shell (7) of parallelepipedic form, constituted by a rectangular horizontal bottom (4), two opposite vertical and longitudinal walls (5) and two opposite vertical and transverse walls (6), a laminated magnetic circuit constituted by a bar (8), of generally parallelepipedic shape, of smaller length and smaller width than the inner length and width of the protective shell (7), extending along the longitudinal axis (xy) of the outer protective shell (7), this bar (8) presenting, in its upper part, a succession of transverse recesses (9) regularly spaced from one another in the longitudinal direction, opening out in the upper face (8*b*) and in the two vertical and longitudinal faces of the bar (8), delimiting therebetween teeth (11) constituting polar pieces, inductor windings (13, 14, 16, 17, 18) housed in the recesses (9) of the magnetic bar (8) and an insulating matter (15) filling the space left free inside the protective shell (7), between the latter and the magnetic bar (8) and the windings that it supports, the height of the magnetic bar (8) being greater than the height of the longitudinal (5) and transverse (6) walls of the protective shell (7), so that, after the insulating matter (15) has been cast, polar faces (8*b*) of the teeth (11) of the magnetic bar emerge from the block of solidified insulating matter (15), the inductor windings (13, 14, 16, 17, 18) being disposed respectively in different horizontal planes, the inductor winding (13) located in an upper plane comprising a number of turns greater than that of the winding (14) located in a plane therebeneath.

* * * * *